United States Patent
Watanabe

(10) Patent No.: US 7,982,821 B2
(45) Date of Patent: Jul. 19, 2011

(54) DISPLAY DEVICE AND LIQUID CRYSTAL DISPLAY DEVICE

(75) Inventor: Hisashi Watanabe, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 771 days.

(21) Appl. No.: 12/088,889

(22) PCT Filed: Jul. 19, 2006

(86) PCT No.: PCT/JP2006/314300
§ 371 (c)(1), (2), (4) Date: Apr. 1, 2008

(87) PCT Pub. No.: WO2007/072600
PCT Pub. Date: Jun. 28, 2007

(65) Prior Publication Data
US 2009/0040155 A1  Feb. 12, 2009

(30) Foreign Application Priority Data

Dec. 20, 2005  (JP) .................................. 2005-366936

(51) Int. Cl.
*G02F 1/1335* (2006.01)
*G09F 13/04* (2006.01)

(52) U.S. Cl. ............. 349/62; 349/63; 349/64; 362/97.1; 362/97.2

(58) Field of Classification Search .................... 349/62; 345/84
See application file for complete search history.

(56) References Cited

U.S. PATENT DOCUMENTS

| | | |
|---|---|---|
| 6,195,140 B1 | 2/2001 | Kubo et al. |
| 6,295,109 B1 | 9/2001 | Kubo et al. |
| 6,330,047 B1 | 12/2001 | Kubo et al. |
| 7,321,349 B2 * | 1/2008 | Fukuda et al. .................. 345/84 |

(Continued)

FOREIGN PATENT DOCUMENTS

JP   2000-298267    10/2000

(Continued)

OTHER PUBLICATIONS

Sato et al., "35.4 Novel Transflective LCD with Micro-lens Array to Double the Brightness", *SID 07 Digest*, pp. 1274-1277.

(Continued)

*Primary Examiner* — Hemang Sanghavi

(74) *Attorney, Agent, or Firm* — Nixon & Vanderhye, P.C.

(57) ABSTRACT

A display device of the present invention includes: an illumination device that emits light; first and second substrates provided opposite each other; and the first substrate being disposed closer to the backlight device than the second substrate is; and a plurality of microlenses (2) provided on the surface, opposite the backlight device, of the first substrate, the plurality of microlenses converging light (7) emitted from the illumination device, the first substrate having a plurality of pixels (Px) disposed in a matrix, each of the pixels including: a transparent region (Tr) through which light passes; and a reflective region (Rf) from which light is reflected, wherein the light (7) emitted from the illumination device is converged onto the transparent region (Tr) through the microlens (2), wherein an uneven section (19) with convexities and concavities is provided between the neighboring microlenses (2) on the surface of the first substrate which surface is opposite the illumination device (3). With this arrangement, it is possible to provide a display device which enhances efficiency in utilization of light emitted from the illumination device (backlight) and increases luminance of the display device without such display problems as bright lines and moiré.

11 Claims, 12 Drawing Sheets

U.S. PATENT DOCUMENTS

| | | | |
|---|---|---|---|
| 7,887,208 B2 * | 2/2011 | Tsukada | ............ 362/97.1 |
| 2001/0020991 A1 | 9/2001 | Kubo et al. | |
| 2001/0055082 A1 | 12/2001 | Kubo et al. | |
| 2004/0233354 A1 | 11/2004 | Uehara et al. | |
| 2005/0018118 A1 | 1/2005 | Kubo et al. | |
| 2005/0041177 A1 | 2/2005 | Watanabe | |
| 2005/0270455 A1 | 12/2005 | Kubo et al. | |
| 2007/0002227 A1 | 1/2007 | Kubo et al. | |
| 2007/0019138 A1 | 1/2007 | Kubo et al. | |
| 2007/0195237 A1 | 8/2007 | Kubo et al. | |
| 2007/0206128 A1 | 9/2007 | Watanabe | |
| 2007/0257871 A1 * | 11/2007 | Watanabe et al. | ............ 345/84 |

FOREIGN PATENT DOCUMENTS

| | | |
|---|---|---|
| JP | 2000-298627 | 10/2000 |
| JP | 2000-331519 | 11/2000 |
| JP | 2003-107505 A | 4/2003 |
| JP | 2003-255318 | 9/2003 |
| JP | 2004-109644 | 4/2004 |
| JP | 2005-043717 | 2/2005 |

OTHER PUBLICATIONS

Fujimori et al., "53.3: New Color Filter Structures for Transflective TFT—LCD", *SID 02 Digest*, pp. 1382-1385.

Narutaki et al., "Highly efficient transflective TFT-LCDs with novel structure", *IDW '02*, pp. 298-302.

Ueki, et al., "New metrics based on visual perception for evaluating image quality", *IDW '06*, pp. 519-522.

Narutaki et al., "Development of a Novel TFT-LCD With Excellent Legibility Under Any Intensity of Ambient Light", *Sharp Corp., LCD Laboratories*, pp. 121-125.

Kubo et al., "Development of "Advanced TFT-LCD" with good legibility under any ambient light intensity", *Journal of the SID*, Aug. 2000, pp. 299-304.

International Search Report for PCT/JP2006/314300 mailed Oct. 24, 2006.

* cited by examiner

 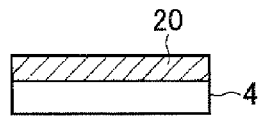 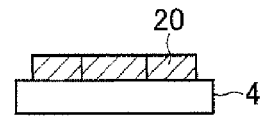
FIG. 6 (a)  FIG. 6 (b)  FIG. 6 (c)
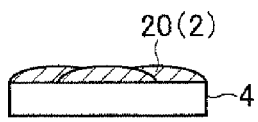 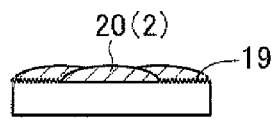
FIG. 6 (d)  FIG. 6 (e)
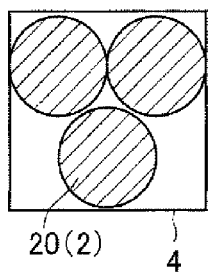 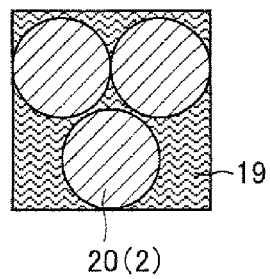

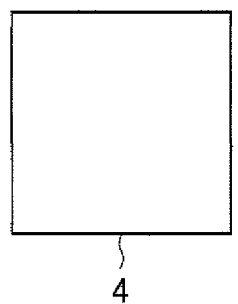

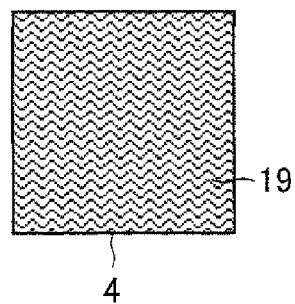

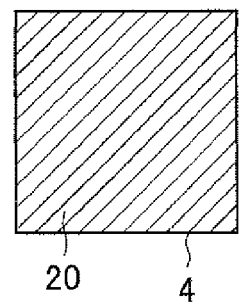

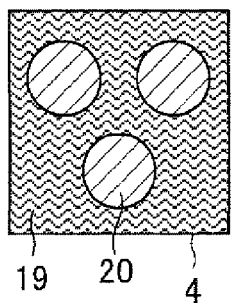

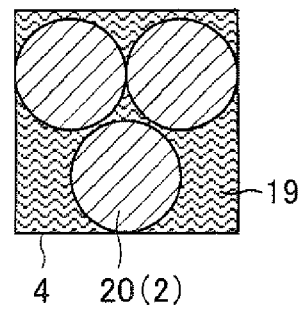

HIGH DIRECTIONAL CHARACTERISTICS
(HIGH DEGREE OF PARALLELISM)

LOW DIRECTIONAL CHARACTERISTICS
(LOW DEGREE OF PARALLELISM)

COLUMN DIRECTION (Y DIRECTION)

ROW DIRECTION (X DIRECTION)

DISPLAY DEVICE AND LIQUID CRYSTAL DISPLAY DEVICE

This application is the U.S. national phase of International Application No. PCT/JP2006/314300 filed 19 Jul. 2006 which designated the U.S. and claims priority to Japanese Patent Application No. 2005-366936 filed 20 Dec. 2005, the entire contents of each of which are hereby incorporated by reference.

TECHNICAL FIELD

The present invention relates to display devices and, in particular, to a non-luminous display device that uses light emitted from an illumination device (backlight) to perform a display.

BACKGROUND ART

Non-luminous display devices that use light emitted from an illumination device to perform a display include liquid crystal display devices, electrochromic display devices, and electrophoretic display devices. Among these, liquid crystal display devices are widely used, for example, in personal computers and mobile phones.

A liquid crystal display device applies a driving voltage to each of picture element electrodes regularly arranged in a matrix so as to change optical properties of a liquid crystal layer corresponding to an opening of the picture element. As a result, the liquid crystal display device displays images and characters thereon.

In a liquid crystal display device, TFTs (Thin Film Transistors), for example, are provided on a plurality of pixels as switching elements, respectively, in order to individually control the pixels. Also, lines are provided in order to supply a predetermined signal to the switching elements.

However, with a TFT (switching element) provided on each pixel, the luminance deteriorates since the pixel area decreases. Furthermore, the switching element and the line cannot be smaller than a certain size due to restrictions that arise from the electric properties and the manufacturing technology. An example of the restrictions arising from the manufacturing technology is the limitation of etching accuracy in photolithography in the order of 1 μm to 10 μm. Therefore, with development of a liquid crystal display device reduced in size with high definition, the following problem becomes significant: The smaller a pixel pitch, the lower open area ratios, and the lower luminance.

As a measure of solving the problem of a low luminance, there is a method in which a light-converging element is provided corresponding to each pixel in a liquid crystal display device so that light emitted from an illumination device is converted onto a transparent region of each pixel. For example, Patent Document 1 discloses a semi-transmissive (transmissive-reflective) liquid crystal display device having a transparent region and a reflective region, wherein a light-converging element such as a microlens is provided.

A semi-transmissive liquid crystal display device has been developed in recent years to be used suitably in a bright environment for mobile phones, for example. A semi-transmissive liquid crystal display device has a pixel including (a) a transparent region that performs a display in a transmissive mode with the use of light emitted from a backlight, and (b) a reflective region that performs a display in a reflective mode with the use of ambient light. Display can be performed in the transmissive mode, the reflective mode, or both modes together, depending on the environment in which the liquid crystal display device is used.

In such a semi-transparent liquid crystal display device, a reflective region needs to be large to some extent so that a predetermined brightness is secured in performing a display reflectively. This results in decrease in area ratio of the transmissive region to the pixel, thus decreasing luminance in the transmissive mode.

Patent Documents 1 and 2 disclose a method for converging light with a high degree of efficiency. According to the method, a semi-transmissive liquid crystal display device includes (i) a reflective plate having an opening and (ii) a light-converging element, such as a microlens, both of which are provided on one surface of a substrate disposed on the backlight side, which surface is on the liquid crystal side. As a result, light which is projected from the backlight into the microlens is converged onto an opening provided on the reflective plate.

According to the arrangement described in Patent Document 2, the reflective plate and the microlens are disposed on the same surface of the substrate and on the liquid crystal side. This makes it possible to contain the reflective plate inside, optimize a distance between the microlens and the reflective plate, and fine alignment between the opening of the reflective plate and the microlens.

Patent Document 3 discloses the following method for increasing light conversion efficiently. According to the method, the base of a microlens is circular or hexagonal. The microlenses and transmissive regions of pixels are arranged in a staggered pattern, and the microlenses are in a one-to-one correspondence with the transmissive regions. Further, the focal point of the microlens is placed at the center of the transmissive region of the pixel. As a result, light-converging efficiency of the microlens (efficiency in utilization of light projected from an illumination device) is improved.

Patent Document 1: Japanese Unexamined Patent Application Publication No. 11-109417 (published on Apr. 23, 1999)

Patent Document 2: Japanese Unexamined Patent Application Publication No. 2002-333619 (published on Nov. 22, 2002)

Patent Document 3. Japanese Unexamined Patent Application Publication No. 2003-255318 (publicized on Sep. 10, 2003)

DISCLOSURE OF INVENTION

As described above, various methods have been suggested for converging light emitted from the illumination device onto each pixel through the use of the light-converging element, such as a microlens, so as to increase luminance of a display device.

In the case of a display device including a light-converging element such as a microlens, light emitted from an illumination device needs to have a high degree of parallelism (Light with a low degree of parallelism is not sufficiently converged onto the transmissive region). Disposition of a diffusion layer between an illumination device and light-converging means is not preferable in consideration of maintaining such a high degree of parallelism. Also, disposition of a light-diffusing layer on a display device is not preferable since a displayed image appears blurred, and the contrast of a displayed image is decreased due to diffused reflection of ambient light.

However, a light diffusing layer needs to be disposed between an illumination device and a display device so that a smooth and uniform display can be performed. Without the light diffusing layer, display problems occurs such as "bright lines" which are visible forms of a light source of the illumination device, and "moiré" which stems from a light projection pattern of the illumination device and a pixel pitch of a display device.

The "bright lines" occur when light having a high intensity appears in the shape of a line as a display device is viewed obliquely from the opposite side from the light source. This is because the light emitted from the light source travels in a light-guiding plate in the light-guiding direction, and is projected obliquely and intensely.

The "moiré" can be prevented by optimizing, for a pixel pitch of the display device, the pitch and angle of prisms. The prisms help a display panel show the light emitted from the light source of the illumination device. However, the pixel pitch and the prism pitch change subjectively from one angle to another when a display panel is viewed from various angles. Therefore, it is difficult to prevent moiré in all viewing angles.

For example, even if the pitch and angle of the prisms in the illumination device are designed so that the moiré does not occur when the display device is viewed from the front, moiré does occur when the display device is viewed obliquely. This is because actual pixel pitch and prism pitch become smaller, i.e. the designed conditions are changed when the display device is viewed obliquely. The aforementioned Patent Documents are completely silent about bright lines and moiré that occur when a light-converging element is disposed.

The present invention was accomplished in view of the above problems. An object of the present invention is to: provide a display device and a liquid crystal display device which enhance efficiency in utilization of light emitted from the illumination device (backlight) and increase luminance of the display device without such display problems as bright lines and moiré.

In order to solve the above problems, a display device of the present invention includes: a backlight emitting light; first and second substrates provided opposite each other; and a plurality of light-converging sections provided on a surface of the first substrate which surface is opposite the backlight, the first substrate being disposed closer to the backlight than the second substrate is, each of the light-converging sections converging light emitted from the backlight, the first substrate having a plurality of pixels disposed in a matrix, each of the pixels including: a transparent region through which light passes; and a reflective region from which light is reflected, wherein light emitted from the backlight is converged onto the transparent region through the light-converging section, and wherein an uneven section with convexities and concavities is provided between the neighboring light-converging sections on the surface of the first substrate which surface is opposite the backlight.

Also, in order to solve the above problems, a liquid crystal display device of the present invention includes: a backlight emitting light; first and second substrates provided opposite each other; and a plurality of light-converging sections provided on a surface of the first substrate which surface is opposite the backlight, the first substrate being disposed closer to the backlight than the second substrate is, each of the light-converging sections converging light emitted from the backlight, the first substrate having a plurality of pixels disposed in a matrix, each of the pixels including: a transparent region through which light passes; and a reflective region from which light is reflected, wherein light emitted from the backlight is converged onto the transparent region through the light-converging section, and wherein an uneven section with convexities and concavities is provided between the neighboring light-converging sections on the surface of the first substrate which surface is opposite the backlight.

According to the above arrangement, the uneven section is formed between the light-converging sections on the surface of the first substrate which surface is opposite the backlight device. This does not decrease in parallelism of the light projected from the backlight into the light-converging section. Therefore, light is collected onto the transmissive region with use of the light-converging section, whereby luminance of light is increased. Furthermore, since the uneven section functions as a light-scattering surface, light projected from the backlight device into the uneven section is diffused due to the surface characteristics of convexities and concavities. In other words, the uneven section functions as a diffusion layer. As a result, the occurrence of bright lines and moiré can be reduced.

Therefore, efficiency in utilization of light emitted from the backlight device can be improved, and luminance of a display device and a liquid crystal display device can be increased, whereby a display device and a liquid crystal display device without such display problems as bright lines and moiré can be provided.

Additional objects, features and strengths of the present invention will be made clear by the description below. Further, the advantages of the present invention will be evident from the following explanation in reference to the drawings.

BRIEF DESCRIPTION OF DRAWINGS

FIG. 4 (b) is a cross sectional view taken along the line A-B in FIG. 4 (a).

FIG. 4 (c) is a cross sectional view taken along the line C-D in FIG. 4 (a).

FIG. 4 (d) is a plan view of an arrangement of a microlens and a transmissive region.

FIG. 6 (a) shows a manufacturing process of a microlens and an uneven section in a display device.

FIG. 6 (b) shows a manufacturing process of a microlens and an uneven section in a display device.

FIG. 6 (c) shows a manufacturing process of a microlens and an uneven section in a display device.

FIG. 6 (d) shows a manufacturing process of a microlens and an uneven section in a display device.

FIG. 6 (e) shows a manufacturing process of a microlens and an uneven section in a display device.

FIG. 7 (b) shows a manufacturing process of a microlens and an uneven section in a display device different from a display device manufactured by the manufacturing process indicated FIGS. 6(a) to 6(e).

FIG. 7 (c) shows a manufacturing process of a microlens and an uneven section in a display device different from a display device manufactured by the manufacturing process indicated FIGS. 6(a) to 6(e).

FIG. 7 (d) shows a manufacturing process of a microlens and an uneven section in a display device different from a display device manufactured by the manufacturing process indicated FIGS. 6(a) to 6(e).

FIG. 7 (e) shows a manufacturing process of a microlens and an uneven section in a display device different from a display device manufactured by the manufacturing process indicated FIGS. 6(a) to 6(e).

FIG. 12 (b) is a view showing directional characteristics in the shape of an oval.

FIG. 16 (b) is a cross sectional view taken along the line E-F in FIG. 16 (a).

FIG. 16 (c) is a cross sectional view taken along the line G-H in FIG. 16 (a).

FIG. 16 (d) is a plan view of an arrangement of a microlens and a transmissive region.

BEST MODE FOR CARRYING OUT THE INVENTION

Figure 1:
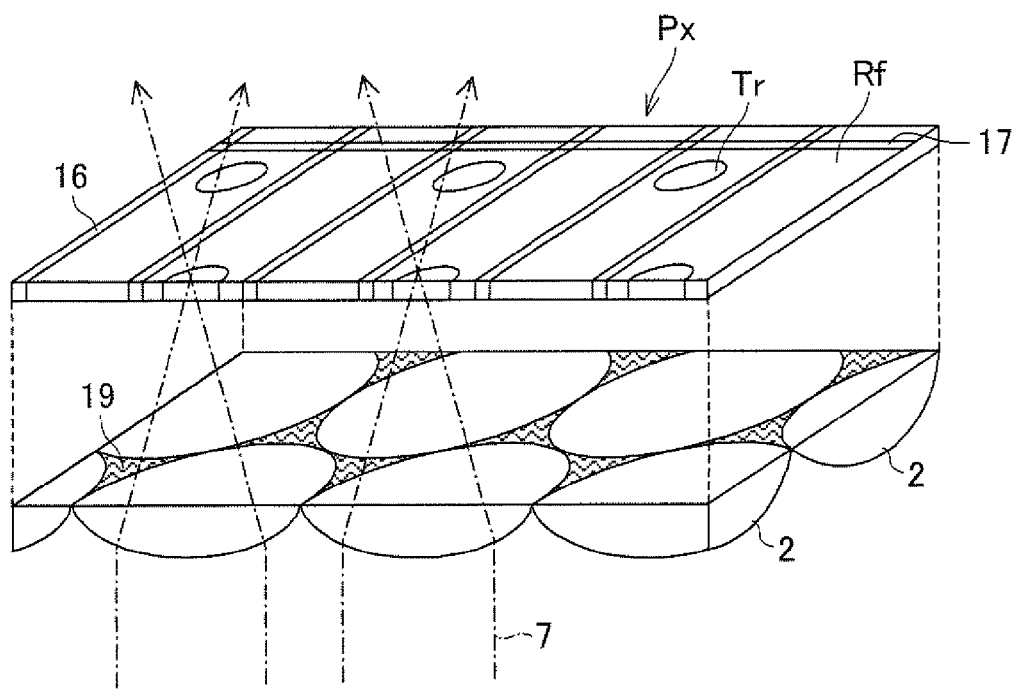
FIG. 1 is a view showing a positional relationship between a microlens and the structure of a pixel section in a display panel.

One embodiment of the present invention is described below with reference to the attached drawings.

A display device (present device) in accordance with the present embodiment is a transparent-reflective (semi-transparent) liquid crystal display device. As FIG. 2 shows, the present device includes a display panel 1, a plurality of microlenses 2, and an illumination device (backlight) 3 in this successive order.

The microlenses 2 are bowl-shaped lenses that are convex toward the illumination device 3, and are circular when viewed from the illumination device 3 (in a plane). The microlenses 2 are provided in contact with the display panel 1. FIG. 2 is a sectional view of the present display device, microlens taken along a line passing through the centers of the neighboring microlenses 2.

The display panel 1 includes: an active matrix substrate (a first substrate) 4; a liquid crystal layer 5; and a color filter substrate (a second substrate) 6 in this order from the microlens 2 and the illumination device 3. In other words, the display panel 1 is arranged such that the liquid crystal layer 5 is sandwiched between the two substrates (the first substrate 4 and the second substrate 6). Also, light 7 is projected from the illumination device 3 into the first substrate 4, while exterior light (ambient light, not indicated in FIG. 2) enters the second substrate 6.

Figure 2:
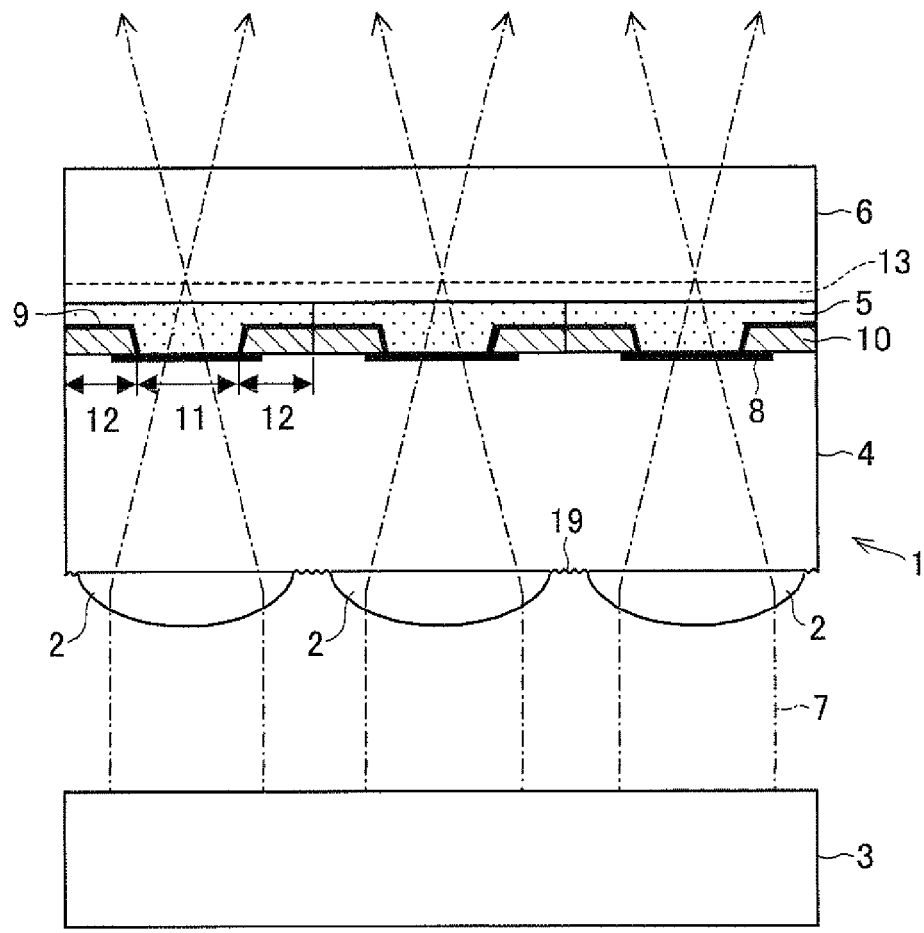
FIG. 2 is a cross sectional view of an outline arrangement of a display device in accordance with the present embodiment.

The first substrate 4 includes: transparent electrodes 8; reflective electrodes 9; an interlayer insulating film 10; a data line 16 (see FIG. 1); a scanning line 17 (see FIG. 1); and a thin film transistor (not indicated in FIG. 2). The transparent electrodes 8 are formed at a predetermined interval on the side of the first substrate 4 facing the liquid crystal layer 5. The reflective electrodes 9 are formed trapezoid in cross section so as to be projected out (so as to be protruded) from the fist substrate 4 toward the liquid crystal layer 5 (toward the second substrate 6). The reflective electrode 9 is disposed between neighboring transparent electrodes 8. The interlayer insulating film 10 is provided so as to insulate the transparent electrode 8 and the reflective electrode 9 from each other.

Also, as FIG. 2 shows, on the side of the first substrate 4 facing the liquid crystal layer 5, there are the following regions: a transparent electrode region 11 (transparent region Tr described later) defined by the transparent electrode 8; and a reflective electrode region 12 (reflective region Rf described later) defined by the reflective electrode 9. The transparent electrode region 11 transmits the light 7 that is emitted from the illumination device 3, to the second substrate 6. The reflective electrode region 12 reflects outside light (not shown) that enters the second substrate 6.

Figure 3:
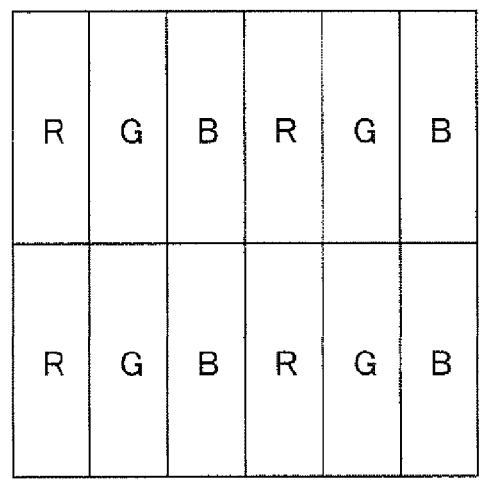
FIG. 3 is a plan view schematically showing a color filter layer.

As FIG. 2 shows, the second substrate 6 has a color filter layer 13 on the liquid crystal layer 5 side. As illustrated in FIG. 3, the color filter layer 13 includes red color filters (R), green color filters (G), and blue color filters (B), which are arranged in a striped pattern.

The microlens 2 is, as FIG. 2 shows, provided in contact with the first substrate 4, between the first substrate 4 and the illumination device 3. The microlens 2 converges light emitted from the illumination device 3 onto the transparent electrode region 11 formed by the transparent electrode 8. More specifically, the microlenses 2 are in a one-to-one correspondence with the transparent electrodes 8, and the center of each of the microlenses 2 corresponds to the center of each of the transparent electrodes 8. In other words, a straight light connecting the center of one of the microlenses 2 and the center of the corresponding transparent electrode 8 is parallel with a normal line to the display panel 1, which is orthogonal to the surface of the display panel 1.

FIG. 1 shows a positional relationship between the microlens 2 and the structure of a pixel section (pixel) Px.

The pixel section Px of the display panel 1 is provided on the first substrate 4, while enclosed by the data wiring 16 and the scanning wiring 17 which are orthogonal to each other. Three adjacent pixel portions Px disposed in the row direction (along the scanning wiring 17, or the x direction in FIG. 5) correspond to color filters of the color filter layer 13 (see FIG. 3). The three pixel sections Px emit red, green and blue light beams, respectively. One picture element consists of the three pixel sections Px that correspond to the three colors R, G, and B of the color filter layer 13. In other words, the pixel sections Px (R, G, B) are arranged in striped pattern so as to correspond to the color filters of the color filter layer 13. The pixel portions Px are not restricted to be arranged in striped pattern (stripe arrangement) and, may be arranged in delta pattern (delta arrangement) or in mosaic pattern (mosaic arrangement).

The pixel section Px has the transparent region Tr at its part corresponding to the transparent electrode 8 (see FIG. 2) and the reflective region Rf at its part corresponding to the reflective electrode 9 (see FIG. 2). The transparent region Tr corresponds to the transparent electrode region 11, and the reflective region Rf corresponds to the reflective electrode region 12. The transparent region Tr is a hole (a concave region) in the reflective region Rf.

While the transparent region Tr performs a display in a transparent mode (i.e., with use of the light 7 from the illumination device 3), the reflective region Rf performs a display in a reflective mode (i.e., with use of outside light). A display can be performed in either one or both transparent mode and reflective mode. Switching between these modes is performed automatically, depending on a surrounding environment. More specifically, in an environment with bright sunlight, such as under a clear sky, light from the backlight is hardly useful due to sunlight. That is, the state of the display remains about the same even if the backlight is turned off. In this case, a display is performed in the reflective mode. On the other hand, in a dark environment without reflected light, a display is performed in the transparent mode.

As explained previously with reference to FIG. 2, the microlenses 2 are in a one-to-one correspondence with the transparent regions Tr in FIG. 1. Furthermore, as FIG. 1 shows, the center of the microlens 2, a spot onto which light passing through the microlens 2 is converged, and the center of the transparent region Tr are on the same straight line extending along the normal line (i.e., in a direction orthogonal to the data wiring 16 and the scanning wiring 17).

Figure 4:
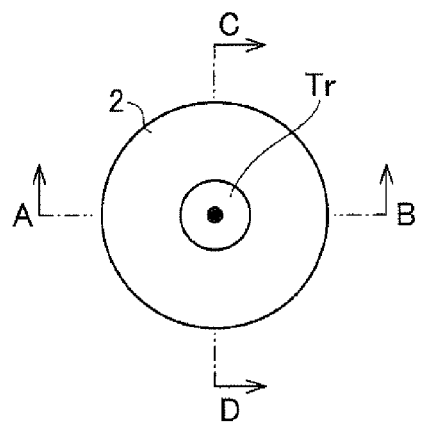
FIG. 4 (a) is a plan view transparently showing a microlens and a transmissive region.
Figure 4:
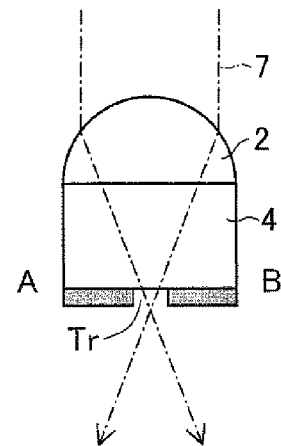
Figure 4:
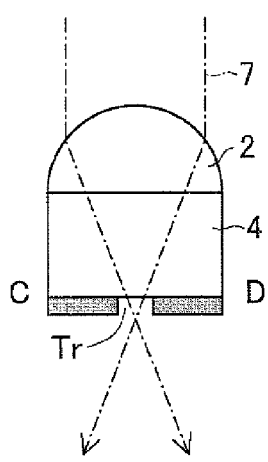
Figure 4:
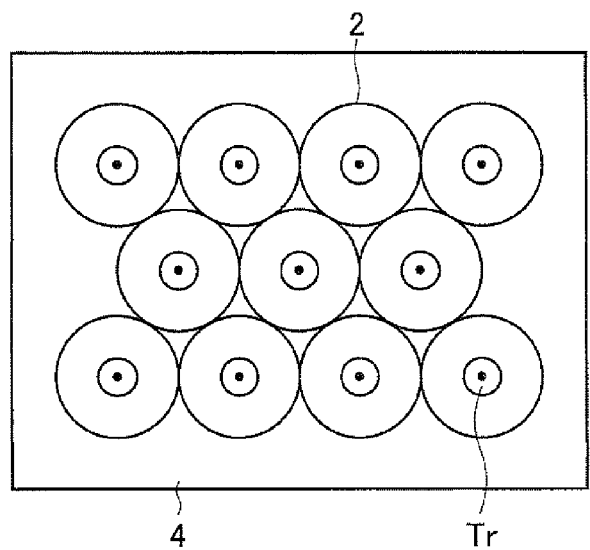

This point will be explained in detail with reference to FIGS. 4 (*a*) to 4 (*d*). FIG. 4 (*a*) is a plan view transparently showing the microlens 2 and the transparent region Tr. As FIG. 4 (*a*) shows, the centers of the microlens 2 and the transparent region Tr are identical and, which corresponds to the spot onto which light passing through the microlens 2 is converged. FIG. 4 (*b*) is a cross sectional view taken along the line A-B in FIG. 4 (*a*), and FIG. 4 (*c*) is a cross sectional view taken along the line C-D in FIG. 4 (*a*). Since the microlens 2 and the transparent region Tr are both circular in a plane, the light conversion spot forms a dot as shown in FIGS. 4 (*b*) and 4 (*c*). Moreover, not only in the cross sections taken along the lines A-B and C-D, but also in any cross sections of FIG. 4 (*a*), the light conversion spot forms a dot.

Figure 5:
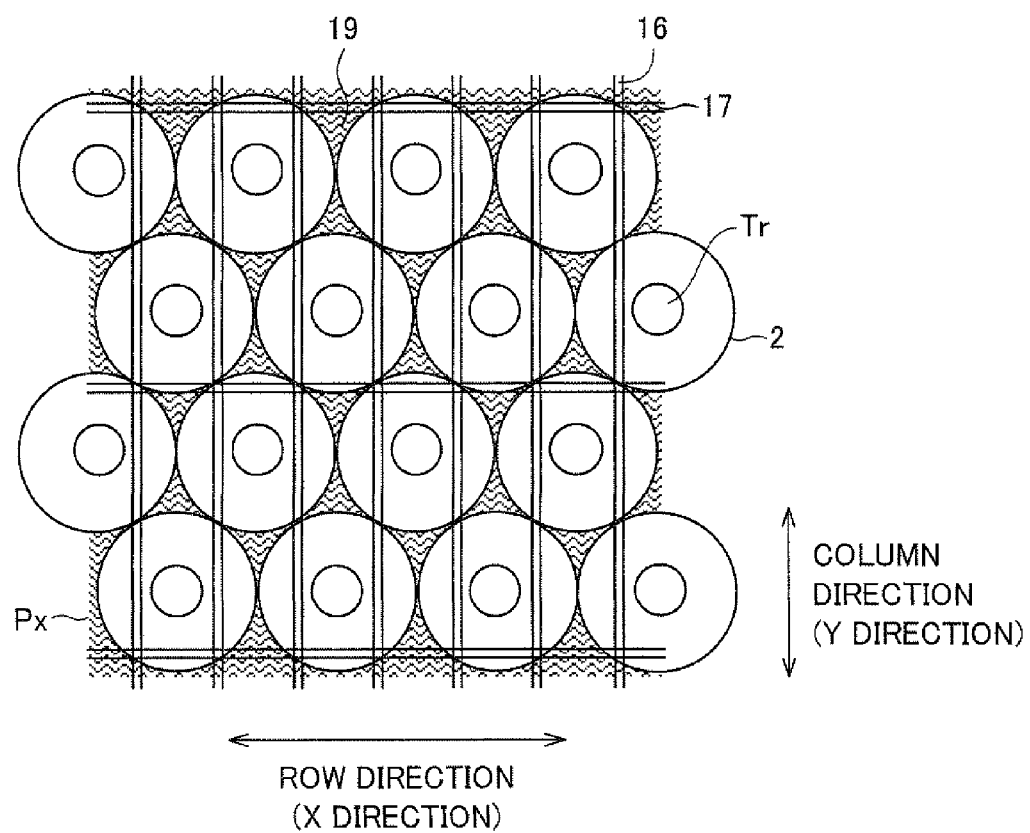
FIG. 5 is a plan view of an arrangement of a microlens and a transmissive region.

As illustrated in FIG. 4(*d*), the microlenses 2 are provided in a staggered pattern on the surface of the first substrate 4 facing the illumination device 3. Similarly, as FIG. 5 shows, the microlenses 2 are disposed in a staggered pattern, and the centers of the microlenses 2 are equally spaced both in the row direction and in the column direction. The column direction extends along the data wiring, i.e., the y direction. In addition, as FIG. 5 shows, the adjacent microlenses 2 in the row direction and the column direction are in touch with each other. With the arrangement in which the microlenses 2 are arranged in a staggered pattern, the microlenses 2 can be densely packed on the first substrate 4.

In the display device including the microlens 2 to enhance luminance as in the present embodiment, light emitted from the illumination device 3 needs to have a high degree of parallelism. Accordingly, a diffusion layer needs to be removed from the illumination device 3 so that parallelism is enhanced as much as possible. This diffusion layer is disposed in order to improve uniformity of emitted light. Therefore, when the diffusion layer is removed, the parallelism improves, but (i) the uniformity on the display deteriorates, (ii) light emitted from the light source becomes visible in the form of a bright line, and (iii) moiré is more likely to occur when the illumination device 3 is used in combination with a liquid crystal panel.

The problem (i) can be avoided by modifications to the backlight, such as optimization of arrangement of the prism in the backlight. However, the problems (ii) and (iii) are unavoidable.

On the contrary, in the display device of the present embodiment, as shown in FIGS. 1, 2 and 5, an area where no microlenses 2 are provided on the surface of the first substrate 4 facing the illumination device 3 is an uneven section 19 with convexities and concavities (The uneven section 19 with convexities and concavities is provided between the neighboring microlenses 2).

By providing the uneven portion 19, it is possible to diffuse light emitted from the illumination device 3 to the uneven section 19. Specifically, light emitted from the illumination device 3 can be diffused on the interface between the first substrate 4 and its surrounding air. As provided on such a part that does not have the microlens 2, the uneven section 19 is provided at an area where no microlenses 2 are provided, and is not therefore disposed on the path through which parallel light emitted from the illumination device 3 toward the microlenses 2 is converged onto the transparent region. This does not decrease parallelism of the light emitted from the illumination device 3. In addition, from a macroscopic viewpoint, since the microlenses 2 can be regarded as large convexities and concavities, the entire backside of the display panel can be made close to a diffusion surface.

Further, as to the difference in height between the convexity and the concavity of the uneven section 19 the arithmetic mean roughness Ra is 2.5 µm in the present embodiment. This makes it possible to increase light diffusion. The arithmetic mean deviation is not limited to 2.5 µm, and may be in the range from 3.0 µm to 5.0 µm. If the arithmetic mean deviation Ra is more than 5.0 µm, it becomes difficult to form the microlens 2. Therefore, the arithmetic mean deviation is preferably 5.0 µm or below. Also, the degree of light diffusion is equal to the haze value of approximately 80 percent.

Explained now is a manufacturing method of the microlens 2 and the uneven portion 19 with reference to FIGS. 6(*a*) to 6(*e*). Each of FIGS. 6(*a*) to 6(*e*) illustrates a plan view and a side view of the manufacturing method of the microlens 2.

First, as FIG. 6(*a*) shows, the first substrate 4 needs to be prepared. As FIG. 6(*b*) shows, a photo-curable transparent resin 20 is applied by spin coating on the side of the first substrate 4 where a lens is to be formed. Next, as FIG. 6(*c*) shows, the first substrate 4 is exposed to light for patterning by photolithography and developed so that portions of the transparent resin 20 are left at an area on which microlenses are to be formed. Then, the transparent resin 20 is heated at the temperature of 150° C. so as to be thermally deformed into the shape of a lens, as illustrated in FIG. 6(*d*). After that, the uneven portion 19 is formed, as FIG. 6(*e*) shows, by corroding such a part (region) that does not have the transparent resin 20 on the first substrate 4 through immersion in hydrofluoric acid. Through this process, the microlenses 2 and the uneven section 19 can be formed on the first substrate 4.

Figure 7:
FIG. 7 (a) shows a manufacturing process of a microlens and an uneven section in a display device different from a display device manufactured by the manufacturing process indicated FIGS. 6(a) to 6(e).
Figure 7:
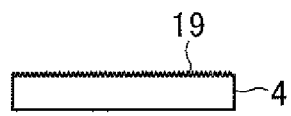
Figure 7:
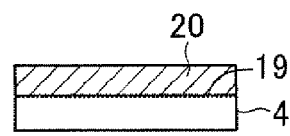
Figure 7:
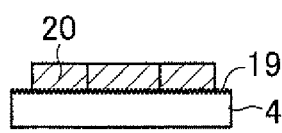
Figure 7:
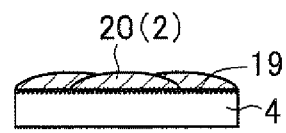

An alternative manufacturing method of the microlens 2 and the uneven portion 19 is as follows. First, as FIG. 7 (*a*) shows, the first substrate 4 needs to be prepared. The first substrate 4 is made thinner, and the side thereof on which a microlens is to be formed is immersed in hydrofluoric acid so that the uneven portion 19 is formed, as FIG. 7(*b*) shows. Next, as FIG. 7(*c*) shows, the photo-curable transparent resin 20 is applied by spin coating. After that, as FIG. 7(*d*) shows, the first substrate 4 is exposed to light for patterning by photolithography and developed so that portions of the transparent resin 20 are left at an area on which microlenses are to be formed. Then, the transparent resin 20 is heated at the temperature of 150° C. so as to be thermally deformed into the shape of a lens, as illustrated in FIG. 7(e). The microlenses 2 and the uneven portion 19 can be formed on the first substrate 4 through this process as well. According to the process based on FIGS. 7 (a) to 7 (e), a microlens and an uneven portion having high optical properties can easily be formed with high mass productivity. Note that the process of making the first substrate thinner with respect to the focal distance of the microlens 2 may be performed at the same time or with the process of immersion in hydrofluoric acid, or may be performed separately from the process of immersion in hydrofluoric acid.

It is preferable that a material having substantially the same refractive index as the first substrate 4 be used for the transparent resin 20. This is because the boundary surface between the microlens array and the uneven portion optically matches, which causes no light diffusion and thus maintains the parallelism of the backlight.

According to the aforementioned method, the uneven portion 19 is formed with use of hydrofluoric acid. However, the method of forming the uneven portion 19 is not limited to this, and may be physical polishing such as sandblasting.

Figure 8:
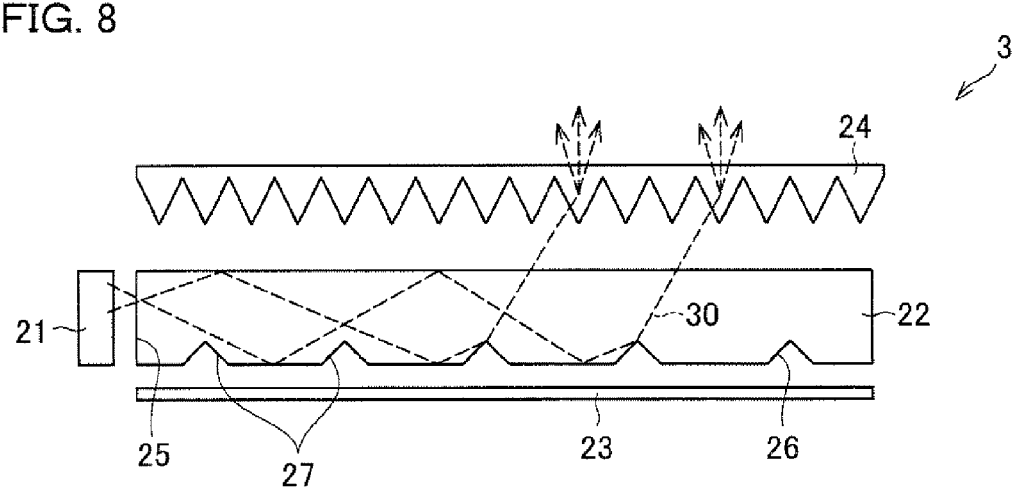
FIG. 8 is a cross sectional view schematically showing an illumination device.

Explained now is the illumination device 3. FIG. 8 is a cross sectional view schematically showing the illumination device 3. The illumination device 3, as FIG. 8 shows, includes an LED 21, a light-guiding plate 22, a reflective plate 23, and a prism sheet 24.

The light-guiding plate 22 is a plate-like member which is rectangular in a plane. The reflective plate 23 is provided on the rear (backside) of the light-guiding plate 22, and the prism sheet 24 is provided on the front side of the light-guiding plate 22. In other words, the light-guiding plate 22 is disposed between the reflective plate 23 and the prism sheet 24. The LED 21 is provided so as to face a corner 25 (see FIG. 9) of the light-guiding plate 22.

The LED 21 emits light as a light source. The light-guiding plate 22, which is made from polycarbonate, polymethyl methacrylate or the like transparent material, guides the light directed from the LED 21 to the inside of the light-guiding plate 22 itself, and outputs the light uniformly toward the outside.

Figure 9:
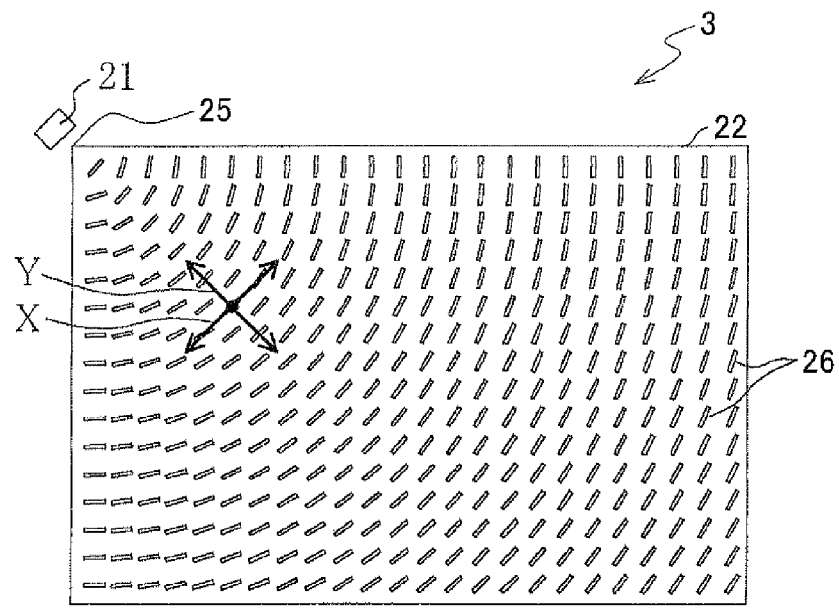
FIG. 9 is a plan view schematically showing an illumination device.

As illustrated in FIG. 8, the light-guiding plate 22 includes a plurality of prisms 26 in the shape of a triangular groove on the backside (i.e. the bottom side; the lower side) thereof. The prisms 26 each contain two reflective surfaces 27 that form a triangular groove. The prisms 26 are, as FIG. 9 shows, disposed in a matrix on the backside of the light-guiding plate 22. The prism 26 reflects light 30 that enters the light-guiding plate 22 on the reflective surface 27, and outputs the light 30 to the outside of the light-guiding plate 22.

As illustrated in FIG. 9, the reflective surface 27 of the prism 26 is formed so as to extend along the X direction which is orthogonal to the radius direction (i.e., the Y direction) of a circle whose center corresponds to the LED 21. Also, the inclination angle of the reflective surface 27 is set so that the reflective surface 27 effectively outputs the light inside the light-guiding plate 22 in a direction along the normal line to the light-guiding plate 22. Additionally, although the neighboring prisms 26 are spaced at regular intervals in FIG. 9 for convenience sake, the prisms are practically spaced at smaller intervals as the distance from the LED 21 increases.

The reflective plate 23 is realized by an aluminum film or the like, and reflects light outputted from the backside of the light-guiding plate 22 back toward the light-guiding plate 22.

The prism sheet 24 serves to effectively leads the light guided through the inside of the light-guiding plate 22 to the outside. The illumination device 3 is explained in detail on pages 509 to 512 of the IDW '02 report (K"al"ant"ar K"alil et al).

Explained briefly now is how this illumination device 3 functions. The light emitted from the LED 21 enters the light-guiding plate 22. The light is reflected by the inside of the light-guiding plate 22, thereby being outputted from substantially the entire output surface of the light-guiding plate 22. The light outputted from the backside of the light-guiding plate 22 (not indicated in the Figure) is reflected by the reflective plate 23 and enters the light-guiding plate. The light is then outputted from the output surface of the light-guiding plate 22. The light outputted from the light-guiding plate 22 enters the prism sheet 24, and is refracted by the prism sheet 24 in a direction along the normal line to the light-guiding plate 22.

In the aforementioned arrangement, the light source is the LED 21. However, a fluorescent tube or the like may also be used. Further, although one LED 21 disposed is in the above arrangement, two or more LEDs 21 may be provided.

Figure 10:
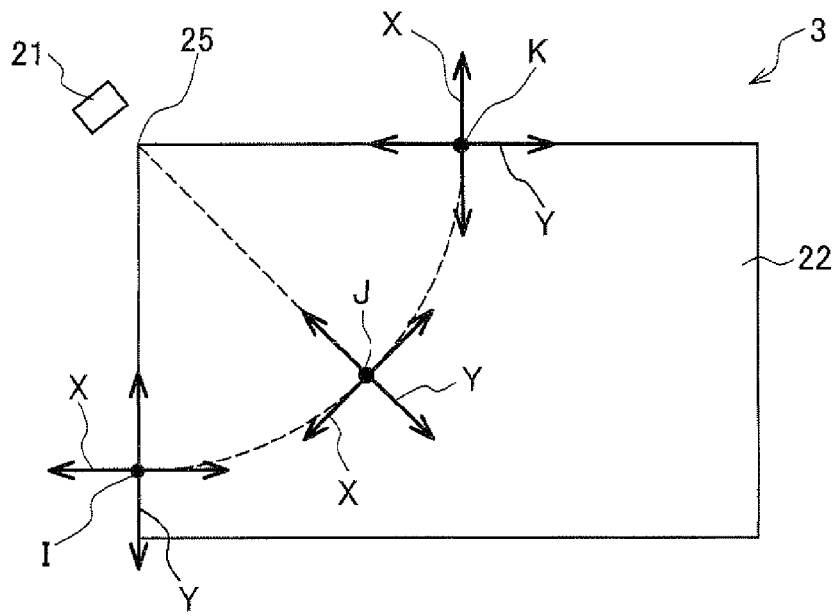
FIG. 10 is a plan view schematically showing an illumination device.

Described now is, as FIG. 10 shows, a mean value of luminances in a first direction and a second direction at three points I, J and K on the light-guiding plate. The three points I, J and K are positioned on an arc whose center corresponds to the LED 21 (The radius of a circle including this arc is smaller than the shorter side of the light-guiding plate). The point I on the arc is, as FIG. 10 shows, on the shorter side of the light-guiding plate 22. The point K is on the side along the length of the light-guiding plate (on the longer side of the light-guiding plate). The point J is on the arc connecting the points I and K.

Figure 11:
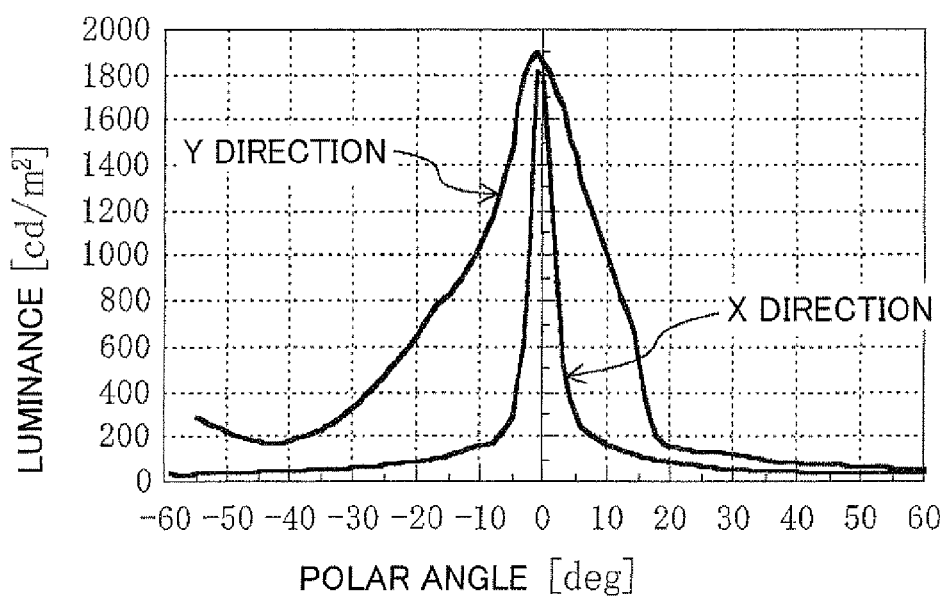
FIG. 11 is a graph showing a relationship between the luminance and the polar angle in a first direction and a second direction.
Figure 12:
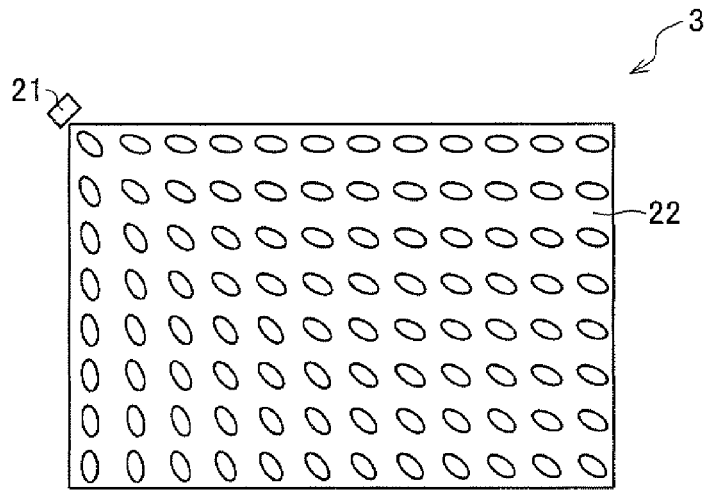
FIG. 12 (a) is a view showing variations of directional characteristics.
Figure 12:
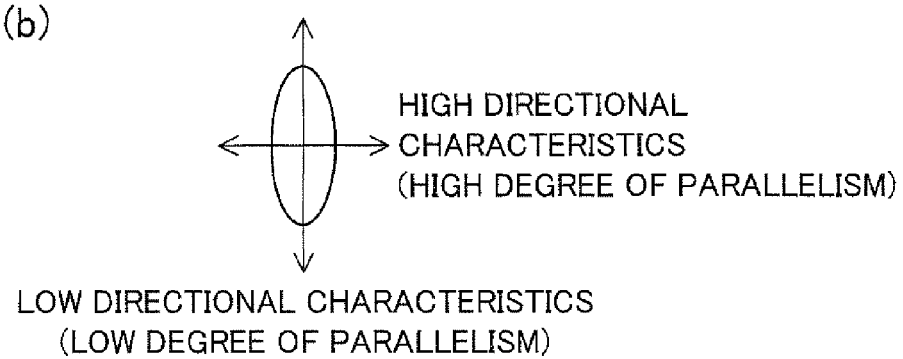

FIG. 11 is a graph showing the result of the study of the first direction and the second direction. In this graph, the vertical axis shows luminance (cd/m2), and the horizontal axis shows polar angles (deg). As this graph shows, while the half bandwidth of the luminance of the light outputted from the light-guiding plate 22 in the second direction is approximately ±3°, the half bandwidth of the luminance of the light outputted from the light-guiding plate 22 in the first direction is approximately ±15°. Therefore, it is apparent that the light outputted in the second direction has higher directional characteristics than that outputted in the first direction, i.e., the directional characteristics of the light outputted in the first direction are different from those of the light outputted in the second direction. In other words, the parallelism of the light outputted in the second direction is higher than that of the light outputted in the first direction. As a result, the outputted light has varying directional characteristics on the output surface of the light-guiding plate. FIG. 12 (a) schematically shows the variations in directional characteristics, with use of ovals.

The shape of the oval shows the directional characteristics of the output light. In other words, as FIG. 12 (b) shows, the directional characteristics are low (i.e., the degree of parallelism of the output light is low) along the longer axis direction of the oval, and the directional characteristics are high (i.e., the degree of parallelism of the output light is high) along the shorter axis direction of the oval.

Figure 13:
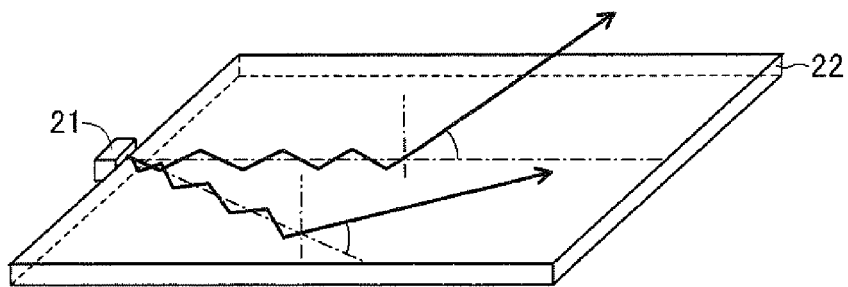
FIG. 13 is a perspective view of an illumination device in which an LED is attached to the center of a side of a light-guiding plate.

Further, the LED 21 is not necessarily located on the corner 25. As shown in FIG. 13, the LED 21 may be provided on the center of a side surface of the light-guiding plate 22.

Figure 14:
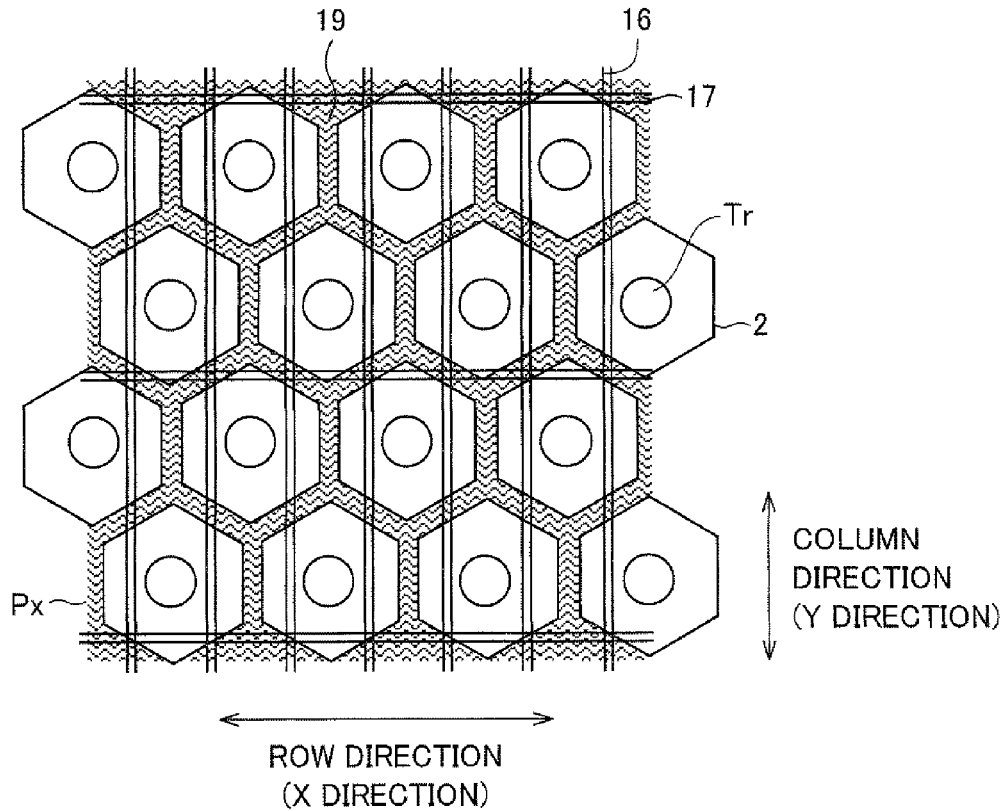
FIG. 14 is a plan view showing an arrangement of a microlens having another shape in a plane, which is different from the shape shown in FIG. 5, and a transmissive region.

According to the aforementioned arrangement, when viewed from the illumination device 3, the microlens 2 is in the shape of a circle, as shown in FIG. 5. However, this is merely an example. As FIG. 14 shows, when viewed from the illumination device 3, the microlens 2 may be in the shape of a polygon such as a hexagon. In a case where the microlens 2 is in the shape of a hexagon, the microlenses 2 are preferably disposed in a staggered pattern as above. In a case where the microlens 2 in the shape of a hexagon, it is preferable that neighboring microlens 2 be disposed at a predetermined distance both in the row direction and in the column direction, and the uneven portion 19 be provided in the space between the neighboring microlens 2.

Figure 15:
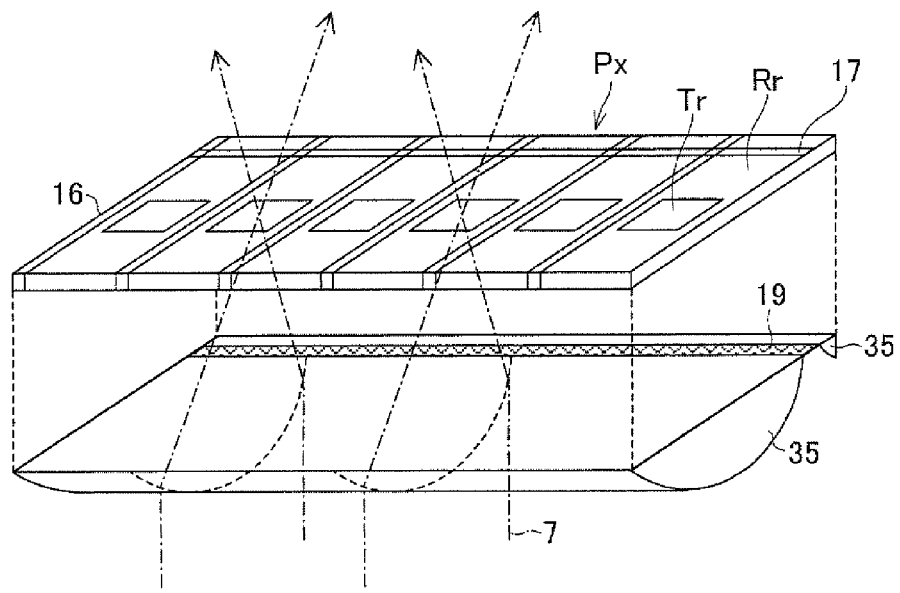
FIG. 15 shows a positional relationship between a microlens that is a half-barrel-shaped lenticular lens unlike in FIG. 1, and the structure of a pixel section in a display panel.

Further, as FIG. 5 shows, the microlens 2 is circular in shape when viewed from the illumination device 3, and disposed in a staggered pattern. However, as FIG. 15 shows, a half-barrel-shaped (semi-cylindrical) lenticular lens 35 may be substituted for the microlens 2. More specifically, the lenticular lens 35 is, as FIG. 15 shows, disposed so as to extend to the sides of the first substrate 4 in the row direction, and the lenticular lenses 35 are provided at a predetermined interval in the column direction. The uneven portion 19 is provided between the neighboring lenticular lenses 35 in the column direction.

Figure 16:
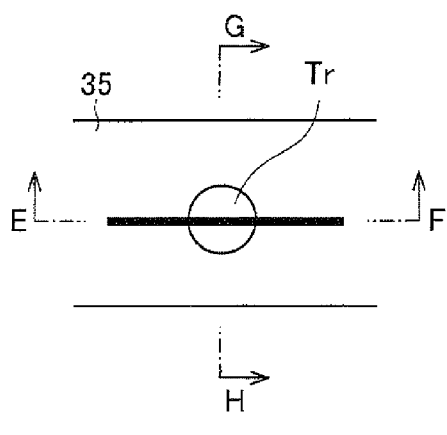
FIG. 16 (a) is a plan view transparently showing a microlens and a transmissive region.
Figure 16:
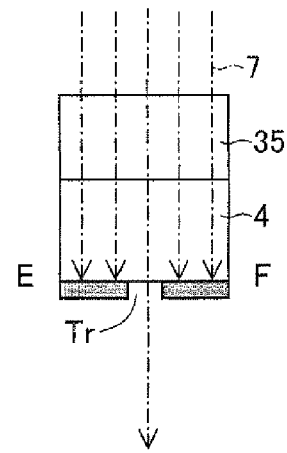
Figure 16:
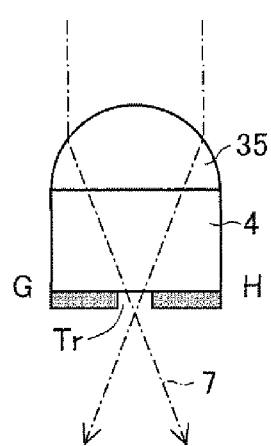
Figure 16:
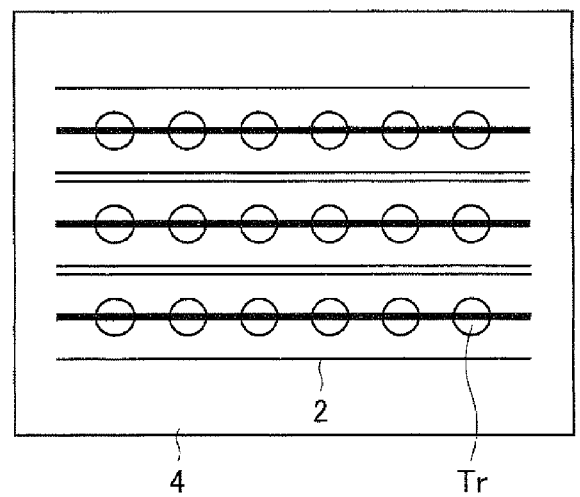

In the case of such a lenticular lens 35 in use, the transparent region Tr provided on the pixel portion Px may be quadrangular in shape as shown in FIG. 15, not circular in shape as shown in FIG. 1. In the case of the lenticular lens 35 in use, the spot on which light passing through the lenticular lens 35 is converged is in the shape of a line, as FIG. 16 shows, unlike the case where the microlens 2 is used. Referring to FIGS. 16 (*a*) to 16 (*d*), the case in which the transparent region is circular will be described.

FIG. 16 (*d*) shows a positional relationship between the lenticular lens 35 and the transparent regions Tr, and the light-converging spot. As FIG. 16 (*d*) shows, the lenticular lens 35 is disposed so as to extend in the row direction of the transparent regions Tr and form the light-converging spot in the form of a straight line (line) passing through the centers of the transparent regions Tr provided in the row direction.

FIG. 16 (*b*) is a cross sectional view taken along the line E-F in FIG. 16 (*a*), and FIG. 16 (*c*) is a cross sectional view taken along the line G-H in FIG. 16 (*a*). The cross section taken along the line E-F is a cross section of the transparent region Tr cut in the row direction. The cross section taken along the line G-H is a cross section of the transparent region Tr cut in the column direction. As FIG. 16 (*b*) shows, in the cross section of the transparent region Tr in the row direction, the lenticular lens 35 is rectangular in shape. Therefore, the light passing through the lenticular lens 35 either directly passes through it without converged onto one spot, or is blocked by the reflective region. On the other hand, as FIG. 16 (*c*) shows, in the cross section of the transparent region Tr in the column direction, the lenticular lens 35 is curved. Therefore, the light is converged onto one spot.

Figure 17:
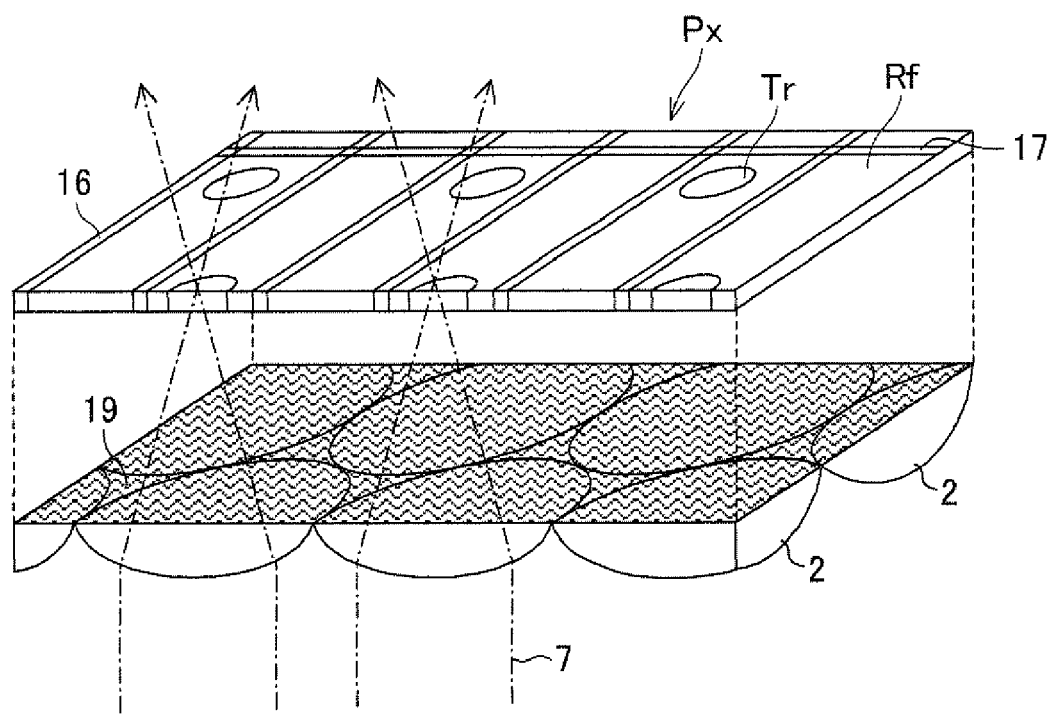
FIG. 17 is a view showing a positional relationship between a microlens in FIG. 1 with an uneven section disposed on its surface and the structure of a pixel section in a display panel.

Also, as FIGS. 1, 15 and others show, the uneven portion 19 is provided between the neighboring microlenses 2 or the neighboring lenticular lenses 35 as described above. However, this is not the only possibility. Alternatively, the uneven portion 19 may be provided in an area where the microlenses 2 are disposed, as FIG. 17 shows.

A display device of the present embodiment is not limited to a semi-transmissive liquid crystal display device, and may be a transmissive liquid crystal display device. Also, the display device of the present embodiment can be an electrophoretic display device including an electrophoretic layer as a display medium layer, other than a liquid crystal layer.

Additionally, a test was performed on a display device not having the uneven portion 19 as a comparative example. The display was defective due to bright lines caused by the light source in the illumination device, and moiré caused by the light projection pattern of the illumination device and the pixel pattern.

The display device of the present invention includes: an illumination device emitting light forward; a display panel having a plurality of pixels disposed in a matrix; and a plurality of light-converging elements provided between the illumination device and the display panel, wherein: the display panel includes: a first substrate; a second substrate; and a display medium layer provided between the first substrate and the second substrate; the first substrate is disposed on a side of the display medium layer which side is opposite the illumination device; the second substrate is disposed on another side of the display medium layer which side is opposite a viewer; each of the plurality of pixels includes a transparent region with which a display is performed in the transmissive mode with use of light emitted from the illumination device; the first substrate includes a transparent electrode region defining the transmissive region; the light-converging elements are disposed respectively corresponding to the transparent regions of the pixels; and an uneven section is provided at least in an area of the first substrate where the light-converging elements are not formed.

The display device of the present invention is preferably such that the light-converging sections are bowl-shaped microlenses, and provided in a one-to-one correspondence with the transparent regions so that an optical axis of light passing through each of the light-converging sections passes through a center of a corresponding transparent region.

According to the above arrangement, the light-converging sections are bowl-shaped microlenses, and provided in a one-to-one correspondence with the transparent regions so that an optical axis of light passing through each of the light-converging sections passes through a center of a corresponding transparent region. As a result, the light-conversion efficiency can be improved. Also, the light-converging section is a bowl-shaped microlens, and the microlenses can be regarded as convexities and concavities from a macroscopic viewpoint. Therefore, when combined with the uneven section, the entire surface of the first substrate which surface is opposite the backlight can be close in structure to a diffusion surface.

Further, the display device of the present invention is preferably such that the light-converging section is circular or polygonal in a plane.

Still further, the display device of the present invention is preferably such that the light-converging sections are disposed in a staggered pattern on the surface of the first substrate which surface is opposite the backlight. According to this arrangement, since the light-converging sections are disposed in a staggered pattern on the surface of the first substrate which surface is opposite the backlight, the packing density can be improved.

Yet further, the display device of the present invention is preferably such that the light-converging sections are half-barrel-shaped lenticular lenses and disposed respectively corresponding to the transparent regions of the pixels arranged in a same row.

According to the above arrangement, the light-converging section is a half-barrel-shaped lenticular lens, which can easily be used for pixels in stripe arrangement because of its shape.

Further, the display device of the present invention is preferably such that the uneven section with convexities and concavities is also provided in an area where the light-converging sections are formed on the surface of the first substrate which surface opposite the backlight device.

Still further, the display device of the present invention is preferably such that one picture element is constituted by three pixels of primary colors R, G and B.

Yet further, the display device of the present invention is preferably such that an arrangement of the pixels is a stripe arrangement, a delta arrangement, or a mosaic arrangement.

Further, the display device of the present invention is preferably such that an arithmetic mean roughness of the uneven section is in the range from 2.0 µm to 5.0 µm.

According to the above arrangement, since the arithmetic mean roughness of the uneven section is in the range from 2.0 µm to 5.0 µm, light diffusion can be improved as far as the light-converging element can be formed. In case of the arithmetic mean roughness of the uneven section being overly high, it becomes difficult to form a light-converging element.

Still further, the display device of the present invention is preferably such that switching is possible between a display mode in which light emitted from the backlight is used and another display mode in which outside light is used.

According to the above arrangement, switching is possible between a display mode in which light emitted from the backlight is used; and another display mode in which outside light is used. Therefore, it is possible to change a mode to an appropriate mode according to the environmental conditions such as ambient brightness.

The display device of the present invention includes: a backlight emitting light; first and second substrates provided opposite each other; and a plurality of light-converging sections provided on a surface of the first substrate which surface is opposite the backlight, the first substrate being disposed closer to the backlight than the second substrate is, each of the light-converging sections converging light emitted from the backlight, the first substrate having a plurality of pixels disposed in a matrix, each of the pixels including: a transparent region through which light passes; and a reflective region from which light is reflected, wherein light emitted from the backlight is converged onto the transparent region through the light-converging section, and wherein an uneven section with convexities and concavities is provided between the neighboring light-converging sections on the surface of the first substrate which surface is opposite the backlight.

Also, a liquid crystal display device of the present invention includes: a backlight device projecting light; first and second substrates provided opposite each other; and a plurality of light-converging sections provided on a surface of the first substrate which surface is opposite the backlight, the first substrate being disposed closer to the backlight than the second substrate is, each of the light-converging sections converging light emitted from the backlight, the first substrate having a plurality of pixels disposed in a matrix, each of the pixels including: a transparent region through which light passes; and a reflective region from which light is reflected, wherein light emitted from the backlight is converged onto the transparent region through the light-converging section, and wherein an uneven section with convexities and concavities is provided between the neighboring light-converging sections on the surface of the first substrate which surface is opposite the backlight.

With this arrangement, it is possible to provide a display device and a liquid crystal display device which enhance efficiency in utilization of light emitted from the illumination device (backlight) and increase luminance of the display device without such display problems as bright lines and moiré.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

A display device of the present invention is applicable to liquid crystal display devices and, in particular, preferably applicable to mobile phones and personal computers.

The invention claimed is:

1. A display device comprising:
a backlight emitting light;
first and second substrates provided opposite each other; and
a plurality of light-converging sections provided on a surface of the first substrate which surface is opposite the backlight, the first substrate being disposed closer to the backlight than the second substrate is, each of the light-converging sections converging light emitted from the backlight,
the first substrate having a plurality of pixels disposed in a matrix, each of the pixels including: a transparent region through which light passes; and a reflective region from which light is reflected,
wherein light emitted from the backlight is converged onto the transparent region through the light-converging section, and
wherein an uneven section with convexities and concavities is provided between the neighboring light-converging sections on the surface of the first substrate which surface is opposite the backlight.

2. The display device according to claim 1, wherein the light-converging sections are bowl-shaped microlenses, and provided in a one-to-one correspondence with the transparent regions so that an optical axis of light passing through each of the light-converging sections passes through a center of a corresponding transparent region.

3. The display device according to claim 2, wherein the light-converging section is circular or polygonal in a plane.

4. The display device according to claim 2, wherein the light-converging sections are disposed in a staggered pattern on the surface of the first substrate which surface is opposite the backlight.

5. The display device according to claim 1, wherein the light-converging sections are half-barrel-shaped lenticular lenses and disposed respectively corresponding to the transparent regions of the pixels arranged in a same row.

6. The display device according to claim 2, wherein the uneven section with convexities and concavities is also provided in an area where the light-converging sections are formed on the surface of the first substrate which surface opposite the backlight device.

7. The display device according to claim 2, wherein one picture element is constituted by three pixels of primary colors R, G and B.

8. The display device according to claim 7, wherein an arrangement of the pixels is a stripe arrangement, a delta arrangement, or a mosaic arrangement.

9. The display device according to claim 2, wherein an arithmetic mean roughness of the uneven section is in the range from 2.0 µm to 5.0 µm.

10. The display device according to claim 1, wherein switching is possible between a display mode in which light emitted from the backlight is used and another display mode in which outside light is used.

11. A liquid crystal display device comprising:
a backlight emitting light;
first and second substrates provided opposite each other so as to sandwich liquid crystal therebetween; and a plurality of light-converging sections provided on a surface of the first substrate which surface is opposite the backlight, the first substrate being disposed closer to the backlight than the second substrate is, each of the light-converging sections converging light emitted from the backlight, the first substrate having a plurality of pixels disposed in a matrix, each of the pixels including: a transparent region through which light passes; and a reflective region from which light is reflected, wherein light emitted from the backlight is converged onto the transparent region through the light-converging section, and wherein an uneven section with convexities and concavities is provided between the neighboring light-converging sections on the surface of the first substrate which surface is opposite the backlight.

* * * * *